US011989868B2

(12) United States Patent
Baijal et al.

(10) Patent No.: US 11,989,868 B2
(45) Date of Patent: May 21, 2024

(54) VIDEO QUALITY ASSESSING METHOD AND APPARATUS

(71) Applicant: SAMSUNG ELECTRONICS CO., LTD., Suwon-si (KR)

(72) Inventors: Anant Baijal, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 17/364,114

(22) Filed: Jun. 30, 2021

(65) Prior Publication Data

US 2022/0036536 A1 Feb. 3, 2022

(30) Foreign Application Priority Data

Jul. 29, 2020 (KR) .................. 10-2020-0094689

(51) Int. Cl.
*G06T 7/00* (2017.01)
*G06F 18/213* (2023.01)
(Continued)

(52) U.S. Cl.
CPC .......... *G06T 7/0002* (2013.01); *G06F 18/213* (2023.01); *G06F 18/214* (2023.01);
(Continued)

(58) Field of Classification Search
None
See application file for complete search history.

(56) References Cited

U.S. PATENT DOCUMENTS 7,873,224 B2   1/2011   Jalil et al.
8,422,795 B2   4/2013   Pahalawatta et al.
(Continued)

FOREIGN PATENT DOCUMENTS

KR   10-2019-0076288 A    7/2019
KR   10-2020-0044652 A    4/2020
KR      20200044652 A  *  4/2020

OTHER PUBLICATIONS

Zou et al., "Perceived Image Quality on Mobile Phones with Different Screen Resolution," Hindawi Publishing Corporation, Mobile Information Systems, vol. 2016, Article ID 9621925, Mar. 6, 2016, (18 pages).

(Continued)

*Primary Examiner* — Delomia L Gilliard
(74) *Attorney, Agent, or Firm* — Sughrue Mion, PLLC

(57) ABSTRACT

Provided is a video quality assessing method and an apparatus thereof. The video quality assessing method includes obtaining a model-based quality score for each of a plurality of sub-areas included in a frame by using a neural network, the neural network being trained based on a mean opinion score (MOS) obtained by using an assessor display apparatus, obtaining a weight matrix from at least one of rendering information or screen information about a screen included in a user display apparatus; applying the weight matrix to the model-based quality score for each sub-area of the plurality of sub-areas, and obtaining a quality score of the frame, based on the model-based quality score for each sub-area to which the weight matrix is applied.

18 Claims, 12 Drawing Sheets

(51) Int. Cl.
  *G06F 18/214* (2023.01)
  *G06N 3/08* (2023.01)
  *G06V 20/40* (2022.01)

(52) U.S. Cl.
  CPC .............. *G06N 3/08* (2013.01); *G06V 20/46* (2022.01); *G06T 2207/10016* (2013.01); *G06T 2207/20081* (2013.01); *G06T 2207/20084* (2013.01); *G06T 2207/30168* (2013.01)

(56) References Cited

U.S. PATENT DOCUMENTS

| | | | |
|---|---|---|---|
| 9,143,776 B2 | 9/2015 | Zhang et al. | |
| 9,706,111 B2 | 7/2017 | Saad et al. | |
| 2016/0212432 A1* | 7/2016 | Wang | H04N 19/154 |
| 2017/0104993 A1* | 4/2017 | Jeong | H04N 19/154 |
| 2018/0041788 A1 | 2/2018 | Wang et al. | |
| 2020/0226740 A1 | 7/2020 | Otroshi Shahreza et al. | |
| 2020/0234469 A1* | 7/2020 | Jeon | G06N 3/084 |
| 2021/0358083 A1 | 11/2021 | Park et al. | |
| 2021/0385502 A1* | 12/2021 | Dinh | H04N 19/46 |

OTHER PUBLICATIONS

Rehman et al., "Display Device-Adapted Video Quality-of-Experience Assessment," Human Vision and Electronic Imaging XX, Proc. SPIE, vol. 9394, IS&T/SPIE Annual Symposium on Electronic Imaging, San Francisco, CA, Feb. 9-12, 2015, (12 pages).

International Search Report (PCT/ISA/210) dated Sep. 14, 2021 by the International Searching Authority in International Application No. PCT/KR2021/007559.

* cited by examiner

VIDEO QUALITY ASSESSING METHOD AND APPARATUS

CROSS-REFERENCE TO RELATED APPLICATION

This application is based on and claims priority under 35 U.S.C. § 119 to Korean Patent Application No. 10-2020-0094689, filed on Jul. 29, 2020, in the Korean Intellectual Property Office, the disclosure of which is incorporated by reference herein in its entirety.

BACKGROUND

1. Field

The disclosure relates to a video quality assessing method and apparatus, and more particularly, to a video quality assessing method and apparatus for accurately assessing quality of a video by applying a weight to a quality score of a frame included in the video.

2. Description of Related Art

Video images encounter distortion in the process of generation, compression, storage, transmission, and reproduction. Distorted images often need to be reproduced within a range that a person can perceive. Accordingly, prior to images being reproduced, it is necessary to measure and assess image quality in order to understand how distortion affects the image quality being perceived by a user.

An image quality assessment technique may be divided into a subjective image quality assessment method and an objective image quality assessment method. The subjective image quality assessment method is a method in which an assessor directly looks at a video and assesses image quality, and may well reflect characteristics of image quality perception of a person. However, the subjective image quality assessment method has disadvantages in that different people may give different ratings. Also, time and costs may be largely consumed in the subjective image quality assessment method, and it is difficult to assess image quality of an image in real time.

The objective image quality assessment method is a method of implementing an algorithm for measuring image quality perceived by a person's optic nerves and assessing a degree of image quality deterioration in a compressed image by using the algorithm.

The objective image quality assessment method may be classified into a full-reference image quality assessment method using a reference image that may be compared with a distorted image, a reduced reference image quality assessment method for performing image quality assessment by using partial information about a reference image, for example, watermarking or an auxiliary channel, instead of using the reference image itself, and a no-reference image quality assessment method for performing an image quality estimation by using only a distorted image instead of using any information about a reference image.

Because the no-reference image quality assessment method does not require reference image information, there is an advantage in that the no-reference image quality assessment method may be used for any application that requires image quality measurement.

SUMMARY

Provided are a video quality assessing method and apparatus capable of accurately assessing quality of a frame by applying a weight matrix to a model-based quality score.

Also, provided are a video quality assessing method and apparatus for assessing quality of a frame based on screen characteristics of a display apparatus.

Furthermore, provided are a video quality assessing method and apparatus for assessing quality of a frame based on rendering characteristics of content.

Additional aspects will be set forth in part in the description which follows and, in part, will be apparent from the description, or may be learned by practice of the presented embodiments of the disclosure.

In accordance with an aspect of the disclosure, there is provided a video quality assessing method. The method includes: obtaining a model-based quality score for each of a plurality of sub-areas included in a frame by using a neural network, the neural network being trained based on a mean opinion score (MOS) obtained by using an assessor display apparatus; obtaining a weight matrix from at least one of rendering information or screen information about a screen included in a user display apparatus; applying the weight matrix to the model-based quality score for each sub-area of the plurality of sub-areas; and obtaining a quality score of the frame, based on the model-based quality score for each sub-area to which the weight matrix is applied.

The screen information includes at least one of screen model mapping information or screen setting mapping information.

The screen information further includes a score for each sub-area included in the screen of the user display apparatus.

The screen model mapping information includes a score relationship according to a difference between a screen model of the assessor display apparatus and a screen model of the user display apparatus, and the difference between the screen model of the assessor display apparatus and the screen model of the user display apparatus is a difference of at least one of a screen size or a resolution.

The screen setting mapping information indicates a score relationship according to a difference between a default setting value for the screen of the user display apparatus and a setting value selected by a user.

The setting value includes a value for at least one of backlight brightness, contrast, gamma, sharpness, color, brightness, or tint for the screen of the user display apparatus.

The video quality assessing method further includes obtaining the screen information from a mapping table pre-stored in the user display apparatus.

The rendering information is obtained from statistical characteristics of a tone mapping graph obtained from high dynamic range (HDR) information extracted from metadata of a video.

The tone mapping graph is obtained for each frame among a plurality of frames in the video.

The video quality assessing method further includes: obtaining a final quality score for a video by accumulating the quality score of the frame for a certain period of time, obtaining time-series data, and smoothing the time-series data; and processing image quality of the video by using the quality score of the frame.

In accordance with an aspect of the disclosure, there is provided a video quality assessing apparatus including: a memory storing one or more instructions and a processor configured to execute the one or more instructions stored in the memory. The processor is configured to: obtain a model-based quality score for each of a plurality of sub-areas included in a frame by using a neural network, the neural network being trained based on a mean opinion score (MOS) obtained by using an assessor display apparatus, obtain a weight matrix from at least one of rendering information or screen information about a screen included in a user display apparatus, apply the weight matrix to the model-based quality score obtained for each sub-area, and obtain a quality score of the frame, based on the model-based quality score obtained for each sub-area to which the weight matrix is applied.

The screen information includes at least one of screen model mapping information or screen setting mapping information.

The screen information further includes a score for each sub-area included in the screen of the user display apparatus.

The screen model mapping information includes a score relationship according to a difference between a screen model of the assessor display apparatus and a screen model of the user display apparatus, and the difference between the screen model of the assessor display apparatus and the screen model of the user display apparatus is a difference of at least one of a screen size or a resolution.

The screen setting mapping information indicates a score relationship according to a difference between a default setting value for the screen of the user display apparatus and a setting value selected by a user.

The setting value includes a value for at least one of brightness, contrast, gamma, backlight brightness, sharpness, color, or tint for the screen of the user display apparatus.

The processor is further configured to obtain the screen information from a mapping table pre-stored in the user display apparatus.

The processor is further configured to obtain a tone mapping graph from high dynamic range (HDR) information extracted from metadata of a video and obtain the rendering information from statistical characteristics of the tone mapping graph.

The tone mapping graph is obtained for each frame among a plurality of frames of the video.

In accordance with an aspect of the disclosure, there is provided a non-transitory computer-readable recording medium having recorded thereon a program that is executed by a computer to perform a video quality assessing method. The video quality assessing method includes: obtaining a model-based quality score for each of a plurality of sub-areas included in a frame by using a neural network, the neural network being trained based on a mean opinion score (MOS) obtained by using an assessor display apparatus; obtaining a weight matrix from at least one of rendering information or screen information about a screen included in a user display apparatus; applying the weight matrix to the model-based quality score for each sub-area of the plurality of sub-areas; and obtaining a quality score of the frame, based on the model-based quality score for each sub-area to which the weight matrix is applied.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
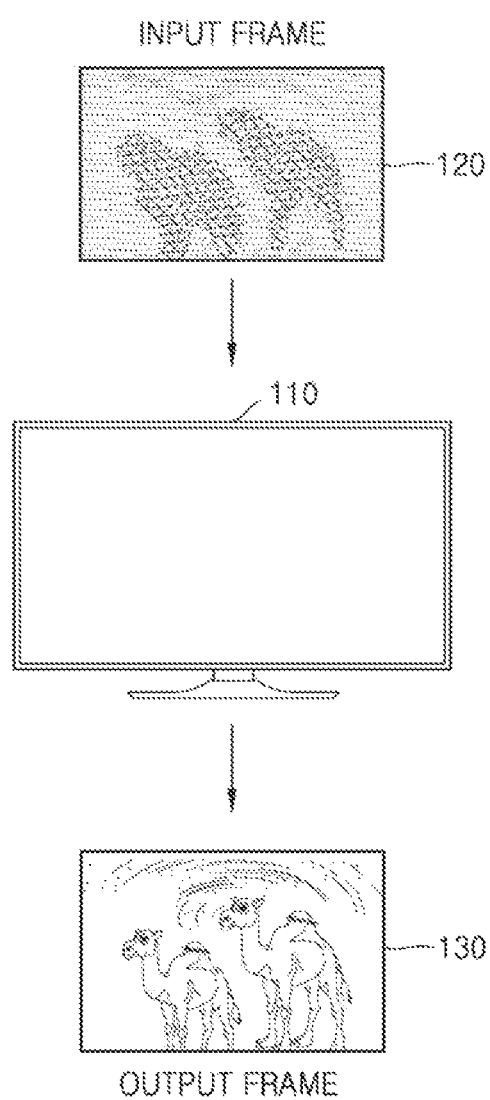
FIG. 1 is a diagram for describing that a user display apparatus that obtains a quality score of a video image and outputs a processed image having improved image quality on a screen, according to an embodiment.

Hereinafter, embodiments of the disclosure will be described in detail with reference to the accompanying drawings. However, the embodiments may be implemented in various forms, and are not limited to the embodiments of the disclosure described herein.

Although terms used herein are general terms which are currently used in association with certain functions in the disclosure, these terms may vary according to intentions of those of ordinary skill in the art, precedents, the emergence of new technologies, or the like. Therefore, the terms used herein should be construed based on the meaning thereof and in the context of descriptions made throughout the disclosure, rather than simply based on the names thereof.

In addition, the terms used herein are for describing the embodiments of the disclosure and are not intended to limit the scope of the disclosure.

Throughout the disclosure, when an element is referred to as being "connected to" another element, the element may be "directly connected to" the other element, or the element may also be "electrically connected to" the other element with an intervening element therebetween.

Throughout the disclosure, the expression "at least one of a, b or c" indicates only a, only b, only c, both a and b, both a and c, both b and c, all of a, b, and c, or variations thereof.

As used herein, in particular, in the appended claims, the directive terms such as "the", "said", and "aforementioned" may indicate both the singular forms and the plural forms. In addition, unless the context clearly indicates otherwise, the order of operations of a method according to one or more embodiments of the disclosure, the operations may be performed in an order different from the embodiments described herein. The one or more embodiments are not limited to the described order of the operations.

A phrase such as "in some embodiments" or "in an embodiment (or in one embodiment)", which appears in various places herein, may not always indicate the same embodiment.

Some embodiments of the disclosure may be represented by functional block components and various processing operations. Some or all of such functional blocks may be implemented by various numbers of hardware and/or software components for performing particular functions. For example, the functional blocks of the disclosure may be implemented by one or more microprocessors or may be implemented by circuit components for certain functions. In addition, for example, the functional blocks of the disclosure may be implemented by various programming or scripting languages. The functional blocks may be implemented by algorithms executed by one or more processors. In addition, the embodiments of the disclosure may implement techniques according to the related art, for electronic environment settings, signal processing, data processing, and/or the like. Terms such as "mechanism", "element", "means", and "component" may be broadly used and are not limited to mechanical and physical components.

In addition, connection lines or connection members between components illustrated in the drawings merely represent examples of functional connections and/or physical or circuit connections. In actual apparatuses, connections between components may be represented by various functional, physical, or circuit connections, which may be substituted or added.

In addition, the term such as " . . . unit", " . . . portion", " . . . module", or the like used herein refers to a unit for processing at least one function or operation, and may be implemented by hardware, software, or a combination of hardware and software.

In addition, the term "user" used herein refers to a person who controls functions or operations of a video quality assessing apparatus, and may include a viewer, a consumer, an administrator, or an installation engineer.

Hereinafter, the disclosure will be described in detail with reference to the accompanying drawings.

FIG. 1 is a diagram for describing that a user display apparatus 110 that obtains a quality score of a video image and outputs a processed image having improved image quality on a screen, according to an embodiment.

Referring to FIG. 1, the user display apparatus 110 may be an electronic apparatus capable of processing and outputting an image. The user display apparatus 110 may be stationary or mobile and may be a digital television (TV) capable of receiving digital broadcast, but is not limited thereto, and may be implemented as various types of electronic apparatuses including a display.

The user display apparatus 110 may include at least one of a desktop computer, a smartphone, a tablet personal computer (PC), a mobile phone, a video phone, an e-book reader, a laptop, a netbook computer, a digital camera, a personal digital assistants (PDA), a portable multimedia player (PMP), a camcorder, a navigation device, a wearable device, a smart watch, a home network system, a security system, or a medical device.

The user display apparatus 110 may be implemented, not only as a flat display apparatus, but also as a curved display apparatus including a screen having a curvature, or a flexible display apparatus capable of adjusting a curvature. An output resolution of the user display apparatus 110 may include, for example, high definition (HD), full HD, ultra HD, or a resolution that is clearer than ultra HD.

The user display apparatus 110 may output a video. The video may include a plurality of frames. The video may include items such as TV programs provided by content providers or various movies or dramas via video on demand (VOD) services. The content providers may mean terrestrial broadcasting stations or cable broadcasting stations providing consumers with various content including videos, over-the-top (OTT) service providers, or internet protocol television (IPTV) service providers.

A video may be captured, compressed, transmitted to the user display apparatus 110, reconstructed by the user display apparatus 110, and then output to a screen of the user display apparatus 110. Due to the limitation of physical characteristics of a device used to capture a video and the limited bandwidth, information may be lost, resulting in distortion of an image. The quality of a distorted video may be deteriorated compared to the quality of an original video.

In an embodiment, the user display apparatus 110 may include a video quality assessing apparatus. The video quality assessing apparatus may objectively assess image quality of a video by using a no-reference image quality assessment method. The video quality assessing apparatus may be manufactured in the form of at least one hardware chip and mounted on the user display apparatus 110, or may be included in the user display apparatus 110 in the form of a chip or an electronic apparatus. Alternatively, the video quality assessing apparatus may be implemented as a software module in the user display apparatus 110.

According to an embodiment, the user display apparatus 110 including the video quality assessing apparatus may perform a video quality assessing method.

Prior to outputting an input frame 120 included in a video on a screen, the user display apparatus 110 may perform quality assessment on the video. The user display apparatus 110 may obtain a score for each of a plurality of frames included in the video.

In an embodiment, the user display apparatus 110 may obtain a quality score of a frame by using an artificial intelligence (AI) technology. For example, the user display apparatus 110 may divide the input frame 120 into a plurality of sub-areas, and may obtain a model-based quality score for each sub-area by using at least one neural network.

The AI technology may include machine learning (e.g., deep learning) and elemental technologies utilizing machine learning. The AI technology may be implemented by utilizing an algorithm. In this regard, an algorithm or a set of algorithms for implementing the AI technology is referred to as a neural network. The neural network may receive input data, perform operations for analysis and classification, and output result data.

The neural network may include a plurality of internal layers performing the operations. The neural network may obtain a different feature map from each of the layers.

In an embodiment, the neural network may be a pre-trained model for video quality assessment. The neural network may be a neural network trained based on a mean opinion score (MOS). The MOS is obtained via human subjective assessment, and may mean an average score obtained by collecting individual parameters for video quality assessed by a number of people.

In general, the MOS is obtained by people assessing quality of a video by using one stationary display apparatus. The neural network is trained to learn a score obtained by using a display apparatus having a fixed specification. Hereinafter, the stationary display apparatus used for obtaining the MOS may be referred to as an assessor display apparatus.

However, a display apparatus used by an actual user or consumer, that is, the user display apparatus 110 shown in FIG. 1, may have a screen specification, that is, a screen model, different from that of the assessor display apparatus.

When screens of the user display apparatus 110 and the assessor display apparatus have different specifications, quality scores obtained by the different display apparatuses may be different. Accordingly, when the user display apparatus 110 performs video quality assessment using the video quality assessing apparatus, the quality score of the frame obtained by using a trained neural network and the quality score obtained by using the assessor display apparatus may be different.

In an embodiment, screen model mapping information indicating a relationship of a quality assessment score generated due to a difference between a model of the assessor display apparatus and a model of the user display apparatus 110 may be pre-stored in the user display apparatus 110. That is, a manufacturer may associate an assessment score of an assessor display apparatus with respect to each user display apparatus of each model with an assessment score of a user display apparatus, generate screen model mapping information based on a result of the association, and store the screen model mapping information in the user display apparatus of each model.

Generally, a user may adjust screen by using various parameters such as brightness or contrast. That is, the user may change various setting parameters for the screen included in the user display apparatus 110 to a desired value and use the user display apparatus 110 having the changed setting parameters. The manufacturer obtains a quality assessment score by using each user display apparatus for respective models to generate screen model mapping information. In this regard, in a state where a screen setting parameter value is set to a default value, a quality assessment score may be obtained via a display apparatus of a corresponding model. However, when the user changes the screen setting parameter value to another value instead of the default value, for example, when the user changes brightness or contrast of the screen to a value other than the default value, a quality assessment score for a video output via the screen having the changed parameter value may be different from a quality assessment score for a video output when set to the default value.

In an embodiment, the manufacturer may obtain a quality assessment score according to a screen setting parameter value of the user display apparatus 110. That is, the manufacturer may allow assessors to assess a video output via a screen having the changed parameter value while changing the screen setting parameter value. The manufacturer may obtain a video assessment score for each parameter and for each parameter value in the same parameter, and may generate therefrom screen setting mapping information indicating a difference between assessment scores according to a default value and a changed value. The manufacturer may store the screen setting mapping information in the user display apparatus 110.

In an embodiment, screen information including at least one of mapping information according to such a screen model or mapping information according to a screen setting may be stored in a memory of the user display apparatus 110. In another embodiment, the user display apparatus 110 may download screen information suitable for the user display apparatus 110 from an external server via an external communication network or the like, and may use the downloaded screen information.

In an embodiment, the user display apparatus 110 may generate a weight matrix by using screen information.

In an embodiment, the user display apparatus 110 may generate a weight matrix by using rendering information about content.

In an embodiment, the user display apparatus 110 may obtain rendering information from high dynamic range (HDR) information. An HDR refers to a difference between the darkest level and the brightest level, that is, a contrast ratio. As a range of the HDR increases, an image having a large difference between the dark level and the bright level may be expressed. The HDR information may include a tone mapping graph. Tone mapping may be used when a display characteristic expressible by a display apparatus does not match a characteristic of HDR content, to map the characteristics.

In an embodiment, the user display apparatus 110 may use HDR information, which is used when rendering content, to obtain a quality assessment score. The user display apparatus 110 may obtain the HDR information from metadata and obtain a tone mapping graph therefrom. The tone mapping graph may be included in the HDR information, or may be generated using the HDR information.

The user display apparatus 110 may analyze distribution characteristics of the tone mapping graph and obtain rendering information therefrom.

In an embodiment, the user display apparatus 110 may generate a weight matrix by using at least one of screen information or rendering information. The user display apparatus 110 may obtain a score to which a weight value is applied according to each sub-area by applying the weight matrix to a model-based quality score.

As described above, according to an embodiment, the user display apparatus 110 may obtain a quality score suitable for the user display apparatus 110 instead of the assessor display apparatus by generating a weight by using screen information about the screen of the user display apparatus 110.

According to an embodiment, the user display apparatus 110 may obtain a quality score suitable for rendering characteristics of content by generating a weight based on rendering information about the content.

The user display apparatus 110 may obtain a final quality score for the video including the plurality of frames by accumulating the score obtained for each frame for a certain period of time with respect to certain frames.

In an embodiment, the user display apparatus 110 may perform image quality processing on the frames included in the video according to the final quality score. In FIG. 1, the user display apparatus 110 may improve the input frame 120 to generate an output frame 130, based on the final quality score. The user display apparatus 110 may output the output frame 130 via a display of the user display apparatus 110.

In another embodiment, a video quality assessing apparatus may not be included in the user display apparatus 110, and may be implemented as a separate apparatus from the user display apparatus 110. That is, the user display apparatus 110 may communicate with the video quality assessing apparatus via a communication network. For example, the user display apparatus 110 may transmit a video to an external video quality assessing apparatus via the communication network. The video quality assessing apparatus may receive the video including a plurality of frames from the user display apparatus 110, and obtain a model-based quality score for each of a plurality of sub-areas included in a frame by using a neural network trained based on a mean opinion score (MOS) obtained by using an assessor display apparatus.

The video quality assessing apparatus may receive, from the user display apparatus 110, screen information about a screen included in the user display apparatus 110. The screen information may include at least one of screen model mapping information or screen setting mapping information. The video quality assessing apparatus may obtain a weight matrix from at least one of the received screen information or rendering information transmitted along with content, and apply the weight matrix to the model-based quality score for each sub-area.

The video quality assessing apparatus may obtain a quality score of the frame based on the model-based quality score for each sub-area to which the weight matrix is applied, and obtain a quality score of the entire video by accumulating time-series data about the plurality of frames. The video quality assessing apparatus may transmit the obtained score to the user display apparatus 110 via the communication network. The user display apparatus 110 may process and output image quality of the video based on the score received from the video quality assessing apparatus.

Alternatively, the video quality assessing apparatus may directly process image quality of the video based on the obtained score, and transmit the processed video to the user display apparatus 110. The user display apparatus 110 may output the video with improved image quality received from the video quality assessing apparatus.

As described above, the video quality assessing apparatus may be provided in the user display apparatus 110 or provided outside the user display apparatus 110. The video quality assessing apparatus may modify a model-based quality score by using a weight matrix obtained by using at least one of screen information about the screen included in the user display apparatus 110 or rendering information about content, and thus obtain a quality score that is suitable for a screen specification of the user display apparatus 110 and accurately reflect rendering characteristics of the content.

Figure 2:
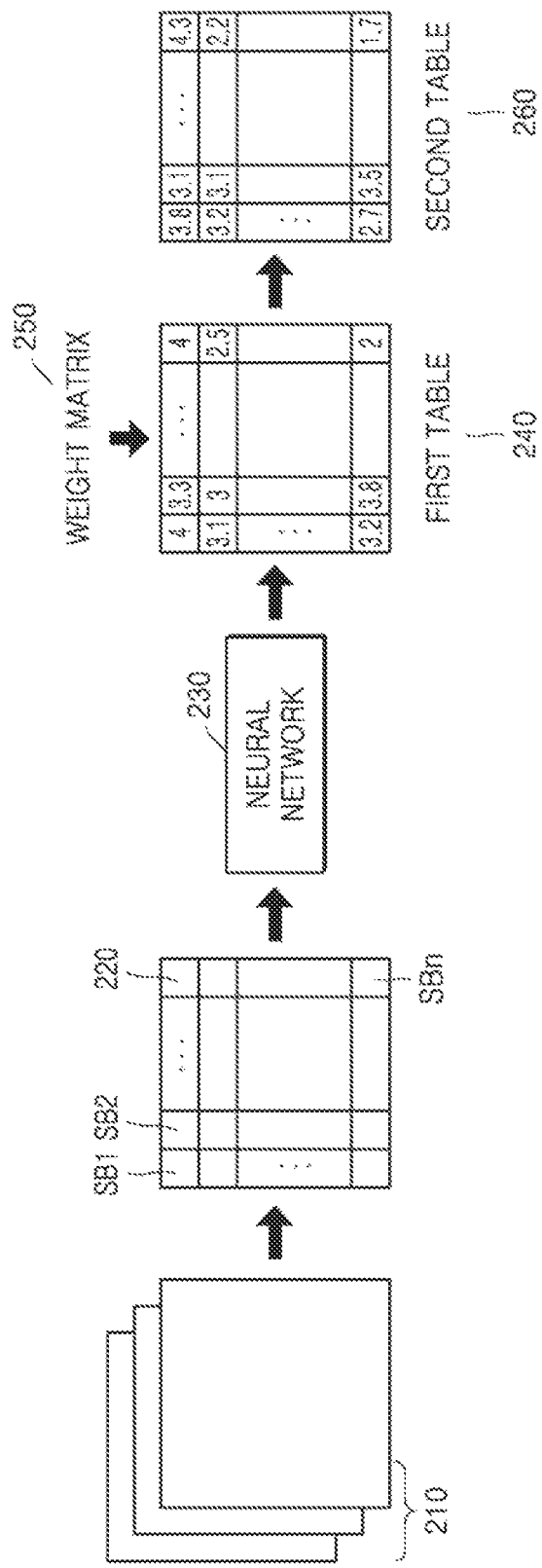
FIG. 2 is a diagram for describing a video quality assessing apparatus that updates a model-based quality score, according to an embodiment.

FIG. 2 is a diagram for describing a video quality assessing apparatus that updates a model-based quality score, according to an embodiment.

The video quality assessing apparatus is an apparatus for assessing quality of a video, and may be an apparatus for assessing quality of a video output via a user display apparatus used by a user. The video quality assessing apparatus may be included in the user display apparatus, or may be coupled with the user display apparatus via a communication network separately from the user display apparatus.

Referring to FIG. 2, the video quality assessing apparatus may obtain a video including a plurality of frames 210. The video quality assessing apparatus may obtain N sub-areas SB1, Sb2, . . . , SBn of a frame 220 among the plurality of frames 210.

The video quality assessing apparatus may obtain a model-based quality score for each sub-area by using a neural network 230.

The neural network 230 may be an algorithm for extracting characteristics from input data, or a set of algorithms, software for executing a set of algorithms, and/or hardware for executing a set of algorithms. The neural network 230 may be a deep neural network (DNN) including at least two hidden layers. The neural network 230 may include a structure in which input data is processed by passing through hidden layers. Each of the layers of the neural network 230 is represented by at least one node, and nodes between the layers are connected by edges.

The neural network 230 may be a model trained to analyze and classify input data and extract a quality assessment score of an image from the input data. In an embodiment, the neural network 230 is a model trained based on an MOS obtained by using the assessor display apparatus.

In FIG. 2, a first table 240 is a table in which a model-based quality score obtained by the neural network 230 for each sub-area is displayed on each sub-area.

In an embodiment, the video quality assessing apparatus may generate a weight matrix 250. The video quality assessing apparatus may generate the weight matrix 250 from at least one of screen information or rendering information.

The screen information may include at least one of screen model mapping information or screen setting mapping information. The screen information may be determined by a manufacturer in advance and stored in a user display apparatus.

A difference between screen models may mean a difference of at least one of a screen size or a resolution. The screen model mapping information may include a score relationship according to a difference between a screen model of the assessor display apparatus and a screen model of the user display apparatus.

The screen setting mapping information may indicate a score relationship according to a difference between a default setting value for the screen of the user display apparatus and a setting value selected by a user.

The video quality assessing apparatus may obtain HDR information from metadata received along with the video. The video quality assessing apparatus may obtain a tone mapping graph from the HDR information, and obtain rendering information from statistical characteristics of the tone mapping graph.

The video quality assessing apparatus may generate the weight matrix 250 by using at least one of the screen information or the rendering information, apply the weight matrix 250 to the model-based quality score, and update a quality score for each sub-area.

In FIG. 2, a second table 260 is a table obtained by applying the weight matrix 250 to the first table 240, and includes a model-based quality score obtained for each sub-area by the neural network 230.

As described above, the video quality assessing apparatus may generate a weight matrix based on screen characteristics of the user display apparatus and rendering characteristics of content, and by applying the weight matrix to a model-based quality score, the video quality assessing apparatus obtains a more accurate quality assessment score for a video.

Figure 3:
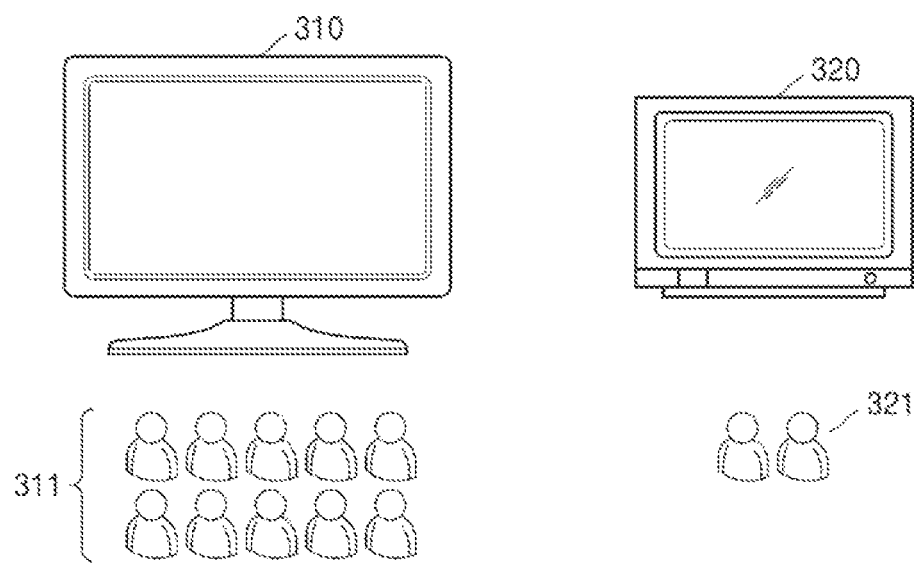
FIG. 3 is a diagram for describing screen model mapping information, according to an embodiment.

FIG. 3 is a diagram for describing screen model mapping information, according to an embodiment.

Referring to FIG. 3, an assessor display apparatus 310 is shown on the left side, and a user display apparatus 320 is shown on the right side.

A plurality of assessors 311 may watch a video and assess video quality of the video by using the assessor display apparatus 310. Scores assessed by the plurality of assessors 311 may be converted into an MOS and used as training data of a neural network.

The user display apparatus 320 may obtain a model-based quality score for the video by using the neural network trained based on the MOS.

Screens included in the assessor display apparatus 310 and the user display apparatus 320 may be of different models (or types). In other words, certain attributes of the assessor display apparatus 310 and attributes of the user display apparatus 320 may be different. For example, a screen included in the assessor display apparatus 310 and a screen included in the user display apparatus 320 may have different sizes and/or resolutions.

When the user display apparatus 320 and the assessor display apparatus 310 have different screen sizes, even when the same video is displayed, an assessment score for the video may be different. Generally, this is because when the screen size is greater, distortion included in an image is more easily seen or perceived by a user. In contrast, when the screen size is smaller, a user may be less likely to recognize the distortion.

Also, when the user display apparatus 320 and the assessor display apparatus 310 have different screen resolutions, even when the video is displayed through the same screen size, an assessment score for the video may vary. This is because the higher the resolution, the greater the number of pixels included in a screen. When the number of pixels in a screen is greater, an image looks clearer, and thus human eyes perceive distortion more sensitively.

Accordingly, a quality score of a frame obtained by a neural network trained by using, as training data, a score obtained by using the assessor display apparatus 310 may be different from a quality score assessed by the user display apparatus 320 having a different size and/or resolution of a screen.

In an embodiment, a relationship of a quality assessment score generated due to a difference between a model of the assessor display apparatus 310 and a model of the user display apparatus 320 may be pre-stored in the user display apparatus 320. That is, a manufacturer that manufactures the user display apparatus 320 may allow a plurality of assessors to use the assessor display apparatus 310 to calculate a video quality score, allow the plurality of assessors to use the user display apparatus 320, which is a different model from that of the assessor display apparatus 310, to calculate a video quality score, and generate screen model mapping information for mapping a relationship between the quality score in the assessor display apparatus 310 and the quality score in the user display apparatus 320.

The screen model mapping information indicates a relationship between MOSs according to a screen model, and may be in the form of a mapping function or a mapping table. The manufacturer may store the screen model mapping information in the user display apparatus 320.

For example, it is assumed that MOSs are 4 points, 2.8 points, and 3.2 points, which are respectively assessed on three videos, A, B, and C, by a plurality of assessors using the assessor display apparatus 310, and MOSs are 4.2 points, 3.1 points, and 3.3 points, which are respectively assessed on the three videos, A, B, and C, by using the user display apparatus 320, where the user display apparatus 320 is different model from the assessor display apparatus 310. The manufacturer may generate a mapping function or a mapping table, each indicating a score relationship between the assessor display apparatus 310 and the user display apparatus 320, and store the mapping function or the mapping table in the user display apparatus 320.

The manufacturer may perform the same method for each user display apparatus model, generate screen model mapping information for associating an assessment score of the assessor display apparatus 310 and an assessment score of a user display apparatus for each model, and store the screen model mapping information in a display apparatus of each model.

The user display apparatus 320 may generate a weight matrix by using the screen model mapping information, and update a quality score by applying the weight matrix to a model-based quality score. The user display apparatus 320 may obtain a quality score of a full frame according to the updated quality score, process image quality of a frame/video based on the obtained score, and output a result to a user 321.

Figure 4:
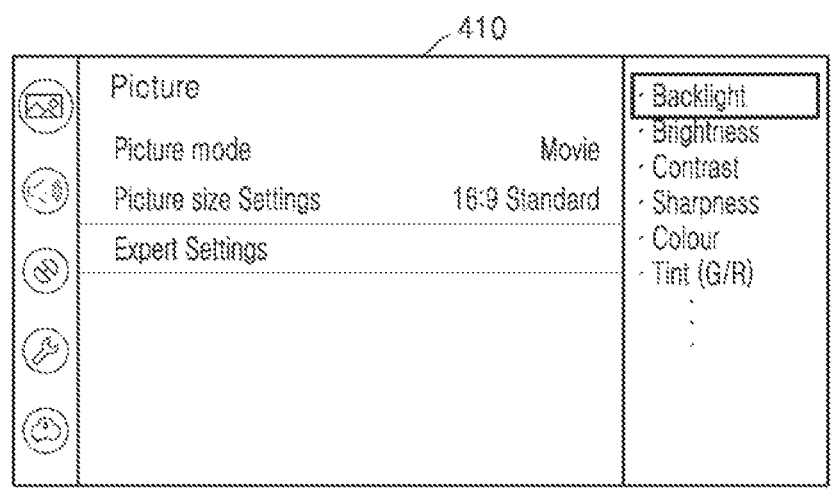
FIG. 4 is a diagram for describing screen setting mapping information, according to an embodiment.

FIG. 4 is a diagram for describing screen setting mapping information, according to an embodiment.

When screens of a user display apparatus and an assessor display apparatus have the same specification, quality scores obtained by using the two apparatuses may be the same. However, when a screen setting parameter value of the assessor display apparatus and a screen setting parameter value of the user display apparatus are different, a quality score of a frame obtained by a neural network in the user display apparatus and a quality score obtained by using the assessor display apparatus may be different.

Also, as described above, when screens of the user display apparatus and assessor display apparatus have different specifications, a manufacturer may obtain a video quality score by using the user display apparatus to generate screen model mapping information. The manufacturer may obtain the video quality score while setting a screen setting value of the user display apparatus to a default value. When a user changes the screen setting value of the user display apparatus to a value other than the default value and uses the user display apparatus having the changed screen setting value, quality scores assessed by the user display apparatus having different screen setting parameter values may be different.

FIG. 4 shows an on-screen display (OSD) menu 410 output on a screen of a user display apparatus. A user may change a screen setting parameter value by using the OSD menu 410. The user may select a desired parameter from among a plurality of screen setting parameters, and change a value of the selected parameter to a desired value.

The screen setting parameters may include at least one of brightness, contrast, gamma, backlight brightness, sharpness, color, or tint for the screen of the user display apparatus.

For example, a quality score assessed by using the screen having the changed setting parameter value may be different from a quality score obtained when a setting parameter is set to a default value. That is, when the screen setting parameter value is changed, image quality of a video that the user watches may be changed. Specifically, when the user sets a value of the brightness among the screen setting parameters to a value darker than a default value, because distortion is not easily seen in a video output of a dark screen, a video assessment score may be greater than a video assessment score when the value of the brightness is set to the default value.

In an embodiment, when assessors assess video quality by using a user display apparatus having the same model, the assessors may assess the quality while a screen setting parameter is fixed to a default value. Also, the assessors may assess the quality when the screen setting parameter value has a value other than the default value. Thus, the user display apparatus may store, as a mapping function or a mapping table, a difference in quality assessment scores according to a difference in parameter values.

The user display apparatus may obtain a quality score for each parameter and for each of parameter setting values in the same parameter, generate screen setting mapping information for correlating differences in assessment scores according to different setting values from a default value, and store the screen setting mapping information in the user display apparatus.

Figure 5:
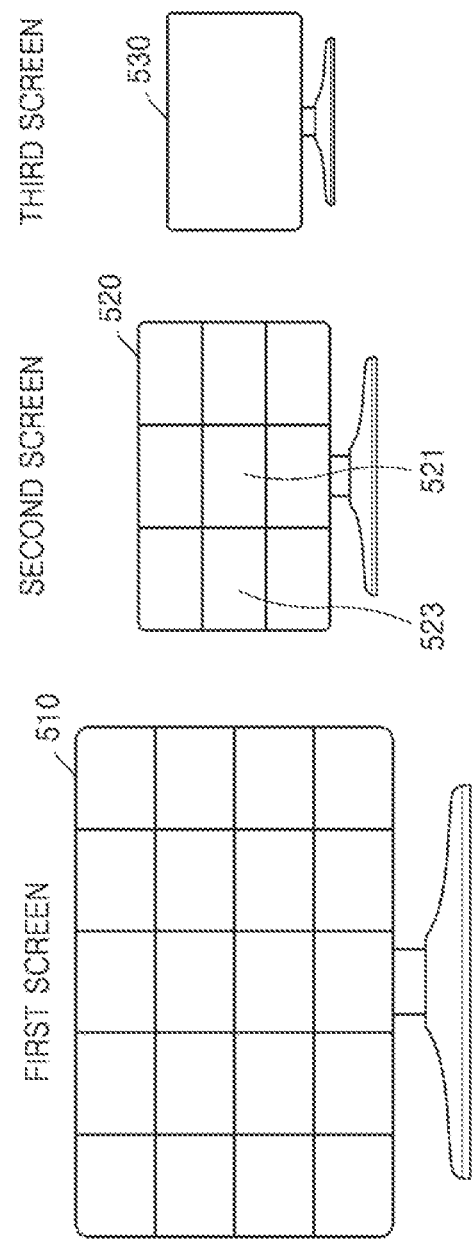
FIG. 5 is a diagram for describing screen information, according to an embodiment.

FIG. 5 is a diagram for describing screen information, according to an embodiment.

The screen information may include at least one of screen model mapping information or screen setting mapping information. The screen information may further include a score for each sub-area included in a screen.

Referring to FIG. 5, a user display apparatus may have various screen sizes. In FIG. 5, three example screens are shown. Here, a first screen 510 has a larger screen than that of a second screen 520, and the size of the second screen 520 is larger than that of a third screen 530.

Generally, when people watch a video, the degree to which people perceive distortion included in the video may vary depending on a position of a screen. People tend to look at the central portion of the screen than the edge portion of the screen. Accordingly, even when the degree of distortion is the same, that is, distortion at the center of the screen and distortion at the edge of the screen are substantially the same, people may perceive the degree of distortion differently.

Also, when a size of a screen is greater than or equal to a certain size, people mainly look at the central portion of the screen, but when a size of a screen is not large, people may view the overall area of the smaller screen at once.

In an embodiment, when a manufacturer stores screen information in the user display apparatus 110, a screen having a screen size of a certain size or more may further include a score for each sub-area in the screen information.

Accordingly, when a plurality of assessors calculate a quality score of a video by using the user display apparatus, the user display apparatus may output videos with distortion in each sub-area of a frame. That is, the user display apparatus may show, to the assessors, a video including distortion only in each of a plurality of sub-areas included in the frame or the screen, such as a video including distortion only in a lower portion of the frame and a video including distortion only in a left portion of the frame, and obtain a corresponding score.

For example, when calculating a quality score of a video by using the second screen 520 of the screens shown in FIG. 5, the user display apparatus may be configured to divide the second screen 520 into nine sub-areas, generate the certain number of videos including distortion in each sub-area, output the videos, and allow the assessors to assess the videos.

For example, it is assumed that an assessment score obtained from the assessors with respect to a video including distortion only in a central area 521 of the nine sub-areas is 1 point, and an assessment score obtained from the assessors with respect to a video including the same distortion only in a left central area 523 of the nine sub-areas is 4 points. Here, the lower the value of the assessment score may mean that the assessors perceive more distortion. This may mean that the assessors look at more of the central area 521 than the left central area 523. Thus, the user display apparatus may be pre-configured to recognize the degree to which each area of the screen affects video quality assessment by assigning a sub-area score, 0.2, to the left central area 523 and assigning a sub-area score, 0.8, to the central area 521. The manufacturer may generate a score for each sub-area indicating the degree to which each area affects video quality assessment with respect to each sub-area of the screen, and include and store the score for each sub-area in the screen information. In another example, when a screen size is less than a certain size, a user may perceive distortion to a substantially similar degree for the entire area of a screen, and thus, in this case, the manufacturer does not separately include, in the screen information, a score for each sub-area included in the screen. That is, in an embodiment, the screen information may further include a score for each sub-area in the screen information only when a screen size is greater than or equal to a certain size. For example, the manufacturer may not include, in the screen information, a score for each sub-area with respect to the third screen 530 having a smaller screen size than a certain size.

Figure 6:
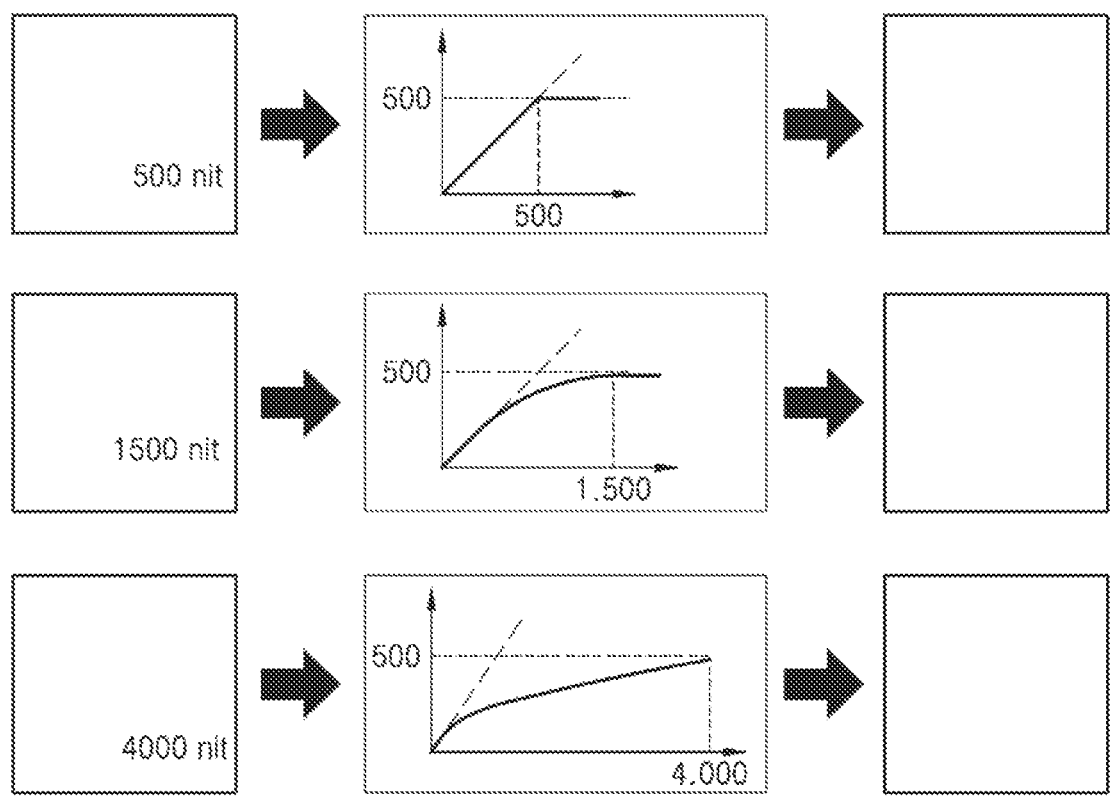
FIG. 6 is a diagram for describing rendering information, according to an embodiment.

FIG. 6 is a diagram for describing rendering information, according to an embodiment. A user display apparatus may use rendering information about content to generate a weight matrix.

Although, in nature, there is a range from complete darkness with no light to extreme brightness comparable to sunlight, a display apparatus may display images only in a significantly limited range compared to the brightness range that human eyes may see. An HDR is an image representation technique that expands the range of contrast so that a bright portion is shown brighter in detail and a dark portion is expressed darker, but in a way that an object is clearly shown.

HDR content and a display apparatus capable of processing the HDR content are required to implement an HDR image.

HDR content creators obtain HDR content by using an HDR-exclusive image camera having a sensitivity to contain a wider range of contrast than that of a general image camera. The HDR content creators may create separate metadata containing HDR information such as a color, brightness, and contrast of content in a content editing process. The HDR content and the metadata about the HDR content may be transmitted together. The metadata may include image characteristic information derived from pixel statistics for each scene or frame. The image characteristic information for each scene may be utilized as an index indicating in which brightness section visual information is distributed in each scene.

An HDR standard defines a processing protocol predetermined to output the best image quality even on respective different display apparatuses when an image is reproduced. A display apparatus reproduces content by utilizing an HDR effect according to the protocol, and such a process is referred to as tone mapping. The tone mapping may be used when a display characteristic that may be expressed by a display apparatus does not match a characteristic of HDR content, to map the characteristics.

The tone mapping may mean mapping of a range of luminance level of HDR content to a luminance level of an actual display apparatus. The luminance mapping may affect a color and a chroma, and the tone mapping may map a color value of HDR content to a color value of an actual display apparatus.

In an embodiment, the user display apparatus may use HDR information to update a quality assessment score. The user display apparatus may obtain the HDR information from metadata and obtain a tone mapping graph therefrom.

FIG. 6 shows three tone mapping graphs. The horizontal axis of each graph is a nit value of HDR content, and the vertical axis thereof is a nit value of a user display apparatus. The nit is measured in $cd/m^2$ and is a unit used to indicate the luminance of a display apparatus.

The user display apparatus may generate a tone mapping curve optimized for physical characteristics of the user display apparatus by using HDR information for each scene or frame included in metadata, and utilize the tone mapping curve for image quality optimization. Alternatively, the user display apparatus may adjust image quality of each frame by extracting a tone mapping curve for each scene from metadata.

FIG. 6 shows a different tone mapping graph for each frame when a maximum luminance of a user display apparatus is 500 nits and maximum luminance level ranges of the three frames are 500 nits, 1,500 nits, and 4,000 nits, respectively. A user display apparatus may substantially reproduce HDR content according to each frame by using a different tone mapping curve with respect to each of the three frames.

In an embodiment, the user display apparatus may analyze statistical characteristics of distribution of a tone mapping graph. The statistical characteristics of distribution of a tone mapping graph may include at least one of a mode, a median, an arithmetic mean, a harmonic mean, a geometric mean, a global minimum, a global maximum, a range, a variance, or a deviation.

The user display apparatus may obtain statistical characteristics of distribution of a tone mapping graph and generate rendering information therefrom. The rendering information may mean tone mapping graph-related statistical characteristics that affect quality assessment of a frame.

For example, when the same distortion is included in a frame having a large HDR and a frame having a small HDR, a degree to which distortion is perceived may vary. That is, when a frame has a low quality score and a large HDR, distortion may be well perceived in the frame. In contrast, distortion may be less likely to be perceived in a frame in which an HDR is small and a contrast ratio of a screen is not large.

In an embodiment, the user display apparatus may generate a weight matrix by considering rendering information according to an HDR for each frame. Accordingly, the user display apparatus may obtain an accurate quality score by applying a weight that takes content rendering characteristics into consideration to a model-based quality score.

In another embodiment, when metadata for HDR content includes one tone mapping curve that is collectively applied to an entire video, not in units of frames, the user display apparatus may obtain the same rendering information with respect to all of a plurality of frames included in the video, and generate a weight matrix based on the rendering information.

In another embodiment, when the user display apparatus is an apparatus that does not support HDR processing, the user display apparatus may use only screen information to generate a weight matrix regardless of rendering information.

Figure 7:
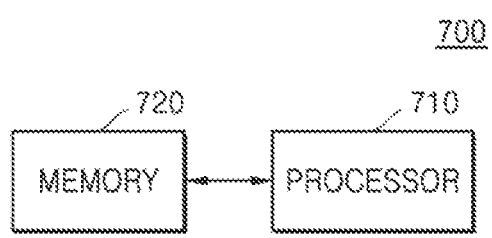
FIG. 7 is a block diagram of a video quality assessing apparatus, according to an embodiment.

FIG. 7 is a block diagram of a video quality assessing apparatus 700 according to an embodiment.

Referring to FIG. 7, the video quality assessing apparatus 700 may include a processor 710 and a memory 720. The video quality assessing apparatus 700 of FIG. 7 may be included in the user display apparatus 110 of FIG. 1.

The memory 720 according to an embodiment may store one or more instructions. The memory 720 may store one or more programs executed by the processor 710. At least one neural network and/or a predefined operation rule or an AI model may be stored in the memory 720. Also, the memory 720 may store data that is input to or output from the video quality assessing apparatus 700.

The memory 720 may include a storage medium of at least one type of a flash memory type, a hard disk type, a multimedia card micro type, a card type memory (e.g., a secure digital (SD) or extreme digital (XD) memory, etc.), a random access memory (RAM), static random access memory (SRAM), a read-only memory (ROM), electrically erasable programmable read-only memory (EEPROM), programmable read-only memory (PROM), magnetic memory, a magnetic disk, an optical disk, or so forth.

In an embodiment, when the video quality assessing apparatus 700 is included in the user display apparatus 110, screen information about a screen of the user display apparatus 110 may be stored in the memory 720. A manufacturer may obtain the screen information about the user display apparatus 110, and may pre-store the screen information in a memory of the user display apparatus 110 in the form of a mapping table or the like. Alternatively, the user display apparatus 110 may download the screen information from a server or the like operated by the manufacturer, and store the screen information in the memory 720.

When the video quality assessing apparatus 700 is not included in the user display apparatus 110, the video quality assessing apparatus 700 may receive, from the user display apparatus 110, screen information about a screen stored in the user display apparatus 110 via a communication network, and store the screen information in the memory 720. Alternatively, the video quality assessing apparatus 700 may download the screen information about the user display apparatus 110 from an external server or the like, and store the screen information in the memory 720.

The screen information may include at least one of screen model mapping information or screen setting mapping information.

The screen model mapping information may include a score relationship according to a difference between a screen model of an assessor display apparatus and a screen model of the user display apparatus 110. The difference between the screen models (or types) may be a difference of at least one of a screen size or a resolution.

The screen setting mapping information may include a score relationship according to a difference between a default setting value for the screen of the user display apparatus 110 and a setting value selected by a user. The setting value may include a value for at least one of brightness, contrast, gamma, backlight brightness, sharpness, color, or tint for the screen of the user display apparatus 110.

When a screen size of the user display apparatus 110 is greater than or equal to a certain size, the screen information may further include a score for each sub-area included in the screen of the user display apparatus 110.

The processor 710 may be configured to control overall operations of the video quality assessing apparatus 700. The processor 710 executes the one or more instructions stored in the memory 720 to control the video quality assessing apparatus 700.

In an embodiment of the disclosure, the processor 710 may perform quality assessment on a video including a plurality of frames. Accordingly, the processor 710 may divide a frame into a plurality of sub-areas, and obtain a model-based quality score by using a neural network for each sub-area. The neural network may be a neural network pre-trained based on an MOS obtained by using an assessor display apparatus.

In an embodiment, the processor 710 may generate a weight matrix by using at least one of screen information or rendering information.

The processor 710 may obtain screen information of the user display apparatus 110 from the memory 720, and obtain rendering information from metadata about a video.

In an embodiment, screen model mapping information and screen setting mapping information of screen information may have the same value in a frame. The rendering information may also have the same value for each frame. However, a score for each sub-area of the screen information may have a different value for each sub-area of a frame.

In an embodiment, the processor 710 may obtain a weight for each sub-area included in a frame by using at least one of screen information or rendering information. The processor 710 may generate a weight matrix for the entire frame by using the weight for each sub-area. The processor 710 may apply the weight matrix to a model-based quality score for each sub-area. The processor 710 may obtain a final quality score for a video by obtaining a score for the entire frame, based on a score for each sub-area, and accumulating the scores.

Figure 8:
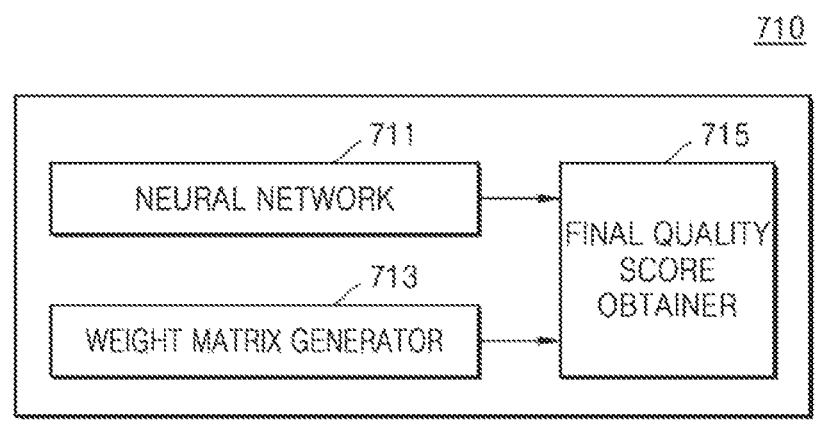
FIG. 8 is a block diagram of a processor according to an embodiment.

FIG. 8 is a block diagram of the processor 710 of FIG. 7.

Referring to FIG. 8, the processor 710 may include a neural network 711, a weight matrix generator 713, and a final quality score obtaining unit 715.

A video input to the video quality assessing apparatus 700 may be divided into a plurality of sub-areas for each frame, and each sub-area is input to the neural network 711.

The neural network 711 may be an algorithm trained to analyze and classify input data, extract a characteristic of the input data, and obtain a quality score therefrom, or a set of algorithms, software for executing a set of algorithms, and/or hardware for executing a set of algorithms.

The neural network 711 may be a pre-trained model for video quality assessment. The neural network 711 may be trained based on MOSs.

The MOS is obtained via human subjective assessment, and may indicate an average value of individual parameters for video quality assessed by people. The neural network 711 may be trained by training based on a correlation between a feature vector and the MOS in advance.

In an embodiment, the MOS, on which the neural network 711 has been trained, may be obtained by using an assessor display apparatus having a screen of a specific model.

The trained neural network 711 may obtain, from each sub-area of the input frame, a feature vector indicating various quality-related features. The quality-related features may include at least one of blur-related features, content-related features, perceptual features, spatial features, deep features for each layer extracted from a plurality of hidden layers, or features statistically extracted from a lower level to an upper level. The neural network 711 may obtain the feature vector indicating above features. The neural network 711 may obtain, from a sub-area, an objective quality score that closely matches a human subjective score according to the correlation between the feature vector and the MOS.

The neural network 711 may transmit, to the final quality score obtaining unit 715, a model-based quality score obtained for each sub-area.

In an embodiment, the weight matrix generator 713 may generate a weight matrix by using at least one of screen information or rendering information. The weight matrix generator 713 may use screen information by extracting the screen information from a mapping table pre-stored in the memory 720 or downloading the screen information for the user display apparatus 110 from a server or the like operated by a manufacturer via a communication network.

The screen information may include at least one of screen model mapping information or screen setting mapping information. When a screen size of the user display apparatus 110 is greater than or equal to a certain size, the screen information may further include a score for each sub-area included in the screen.

The weight matrix generator 713 may take the screen information into account when calculating a weight value so that a difference of a screen size or a resolution according to screen models of the assessor display apparatus and the user display apparatus 110, a difference of a screen setting value of the user display apparatus 110, and a recognition degree for each sub-area of the screen when the screen size is large are reflected in the weight.

The weight matrix generator 713 may obtain the rendering information from HDR information used to render content. The weight matrix generator 713 may obtain the HDR information from metadata of a video. The weight matrix generator 713 may obtain a tone mapping graph from the HDR information, and obtain statistical characteristics of distribution of the tone mapping graph. The statistical characteristics of distribution of the tone mapping graph may include at least one of a mode, a median, an arithmetic mean, a harmonic mean, a geometric mean, a global minimum, a global maximum, a range, a variance, or a standard deviation.

The weight matrix generator 713 may generate the rendering information from the statistical characteristics of distribution of the tone mapping graph.

The rendering information may mean tone mapping graph-related statistical characteristics that affect quality assessment of a frame.

For example, when the same distortion is included in a frame having a large slope and a frame having a small slope, a degree of distortion recognized in each frame may be different. Also, as a quality score of a frame decreases, the distortion may be well recognized in the frame having a large slope. In contrast, when an HDR is small and a contrast ratio of a screen is not large, distortion may be less recognized in the frame.

In an embodiment, the rendering information may indicate a difference of a degree to which distortion is recognized according to a tone mapping graph of a frame. Also, the rendering information may indicate a relationship between a quality score of a frame and an HDR.

The weight matrix generator 713 may obtain rendering information for each frame from a tone mapping graph obtained for each frame. Alternatively, the weight matrix generator 713 may obtain the same tone mapping graph with respect to all frames, and obtain rendering information applied to all the frames therefrom.

The weight matrix generator 713 may use the rendering information when calculating a weight so that a recognition degree of distortion according to an HDR is reflected in the weight.

The weight matrix generator 713 may generate a weight matrix by using at least one of the screen information or the rendering information. When the user display apparatus 110 is an apparatus that does not perform an HDR processing function, the processor 710 may not obtain the rendering information. Accordingly, the processor 710 may generate a weight matrix by using only the screen information.

The weight matrix generator 713 may obtain a weight for each sub-area included in a frame by using at least one of the screen information or the rendering information. In an embodiment, the processor 710 may obtain a weight for each sub-area by multiplying the screen information and the rendering information. The weight may indicate a screen characteristic and rendering characteristic for each sub-area.

The weight matrix generator 713 may generate a weight matrix for an entire frame by using a weight for each sub-area.

The final quality score obtaining unit 715 may apply the weight matrix generated by the weight matrix generator 713 to a model-based quality score for each sub-area obtained from the neural network 711. In an embodiment, the final quality score obtaining unit 715 may obtain a score to which the weight is applied for each sub-area by multiplying a model-based quality score for each sub-area and the weight.

The final quality score obtaining unit 715 may obtain a quality score of an entire frame, based on the model-based quality score for each sub-area to which the weight matrix is applied.

The final quality score obtaining unit 715 may take temporal effects or temporal dependence, each associated with recognizing a video, into account by using a frame quality score accumulated over time.

For example, users may continue to negatively assess video quality even when the video quality is initially poor and then improved. For example, people tend to perceive that qualities of successive frames are worse when frames with poor quality are consecutively output than when frames with poor quality are assessed separately. For example, when a video has the same blur level, people tend to perceive that a blur level is greater in a video with low frames per second (fps) than in a video with high fps. The final quality score obtaining unit 715 may take such temporal effect into account when a final quality score is estimated.

The final quality score obtaining unit 715 may obtain a final quality score for an entire video by smoothing time-series data. The final quality score obtaining unit 715 may use a simple heuristic rule or a complex model to smooth the time-series data.

In an embodiment, when the final quality score obtaining unit 715 obtains a final quality score by using a model, the final quality score obtaining unit 715 may use at least one neural network. For convenience of description, a neural network used by the final quality score obtaining unit 715 will be referred to as a second neural network in order to be distinguished from the neural network 711.

The second neural network may be an algorithm trained to analyze and classify accumulated input data, extract a time-series characteristic of the input data, and obtain a final quality score therefrom, or a set of algorithms, software for executing a set of algorithms, and/or hardware for executing a set of algorithms.

In an embodiment, the final quality score obtaining unit 715 may use long short-term memory models (LSTMs) as the second neural network. The LSTM may be one of recurrent neural networks (RNNs) capable of training long-term dependence between temporal steps of sequence data. The LSTM may receive an input of sequence or time-series data, and may be trained based on long-term dependence between temporal steps of sequence data.

The final quality score obtaining unit 715 may receive an input of time-series data accumulated by the second neural network, and obtain a final quality score for an entire video by considering an effect over time.

As described above, the processor 710 may obtain a model-based quality score via the neural network 711, and apply a weight matrix in which a screen characteristic and a rendering characteristic are reflected, to the score.

The processor 710 may obtain a score for an entire frame from a model-based quality score for each sub-area to which a weight is applied, obtain time-series data by accumulating such scores, and obtain a final quality score for an entire video.

Figure 9:
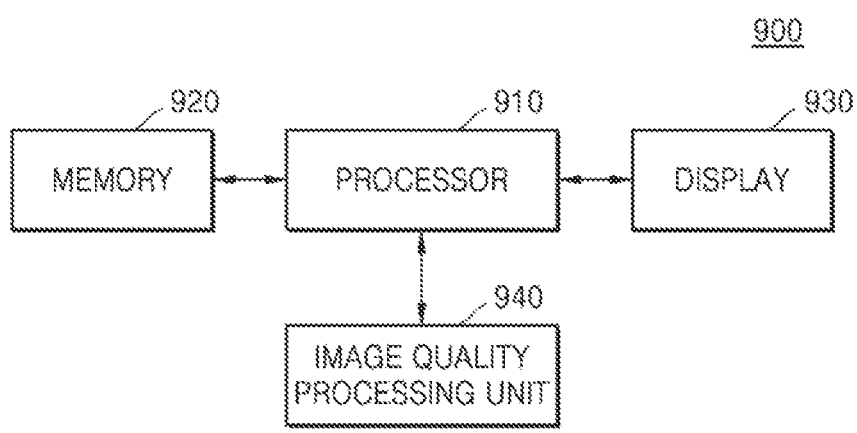
FIG. 9 is a block diagram of a display apparatus, according to an embodiment.

FIG. 9 is a block diagram of a user display apparatus 900, according to an embodiment. The user display apparatus 900 of FIG. 9 may be an apparatus including the video quality assessing apparatus 700 of FIG. 7.

Referring to FIG. 9, the user display apparatus 900 may include a processor 910, a memory 920, a display 930, and an image quality processing unit 940. Functions performed by the processor 910 and memory 920 included in the user display apparatus 900 of FIG. 9 may overlap with functions performed by the processor 710 and memory 720 of FIG. 7. Therefore, duplicate descriptions will be omitted.

The processor 910 may be configured to control overall operations of the user display apparatus 900. The processor 910 may measure quality of a corresponding video before outputting, on a screen, a broadcast program received in real time or a program of a VOD service received by streaming or downloading.

The processor 910 may obtain a model-based quality score for each sub-area of an input frame, and apply an obtained weight matrix to the model-based quality score by using at least one of screen information or rendering information. The processor 910 may obtain a quality score for an entire frame, based on a score for each sub-area. Also, the processor 910 may accumulate a quality score for each frame for a certain period of time, obtain time-series data for a plurality of frames, and obtain a final quality score for a video.

In an embodiment, the image quality processing unit 940 may process image quality of a frame.

In an embodiment, the image quality processing unit 940 may process image quality for each frame or image quality of an entire video by using a plurality of AI models. For example, the image quality processing unit 940 may independently process image quality of a frame by using each of different AI models.

In an embodiment, each of a plurality of AI models may be an image reconstruction model capable of outputting an optimally improved image according to a score of each frame or a final quality score of an entire video by using one or more neural networks.

The image quality processing unit 940 may select one image reconstruction model from among a plurality of neural network models according to a score for each frame or a final quality score of an entire video, or may design such a model autonomously. The image quality processing unit 940 may process image quality of a frame by using a selected neural network-based AI model and improve quality.

In an embodiment, the image quality processing unit 940 may determine the number of times that the image reconstruction model is applied, which can optimally improve image quality of frame or a video. The image quality processing unit 940 may optimally improve the image quality of the frame or video by repeatedly applying the image reconstruction model to the frame or video by the determined number of times.

In an embodiment of the disclosure, the image quality processing unit 940 may modify various hyperparameter values used in a neural network according to a score for each frame or a final score of a video. The image quality processing unit 940 may select a hyperparameter value for a model having an optimal performance to be applied to a frame or video by modifying at least one of the various hyperparameter values such as a filter size, a filter coefficient, a kernel size, and weight values of nodes according to a score of the frame or video. The image quality processing unit 940 may optimally improve image quality of the frame or video by using an AI model having such hyperparameter.

In an embodiment, the image quality processing unit 940 may design a filter to perform image reconstruction according to a score. The image quality processing unit 940 may design a band pass filter (BPF) or a high pass filter (HPF), for which bandwidth of an image frame varies, according to a score of a frame or video, and process image quality of the frame or video by changing a signal of a high frequency band in the frame or video by using the designed filter.

The image quality processing unit 940 may search for an AI model capable of optimally improving quality for each frame or for an entire video according to a score of a frame or video by using the aforementioned various methods. The image quality processing unit 940 may optimally improve the quality of the frame or video by using the AI model.

The display 930 according to an embodiment may output a frame or video processed by the image quality processing unit 940.

When the display 930 is implemented as a touch screen, the display 930 may be used as an input apparatus such as a user interface in addition to an output apparatus. For example, the display 930 may include at least one of a liquid crystal display (LCD), a thin film transistor-liquid crystal display (TFT LCD), an organic light-emitting diode (OLED), a flexible display, a 3D display, or an electrophoretic display. Also, according to an implementation of the user display apparatus 900, the user display apparatus 900 may include two or more displays 930.

The user display apparatus 900 may obtain a quality score for a frame, and select an image reconstruction model for each frame or an entire video by using the obtained quality score. After improving quality of each frame or a video, the user display apparatus 900 may output the frames or the video via the display 930.

Figure 10:
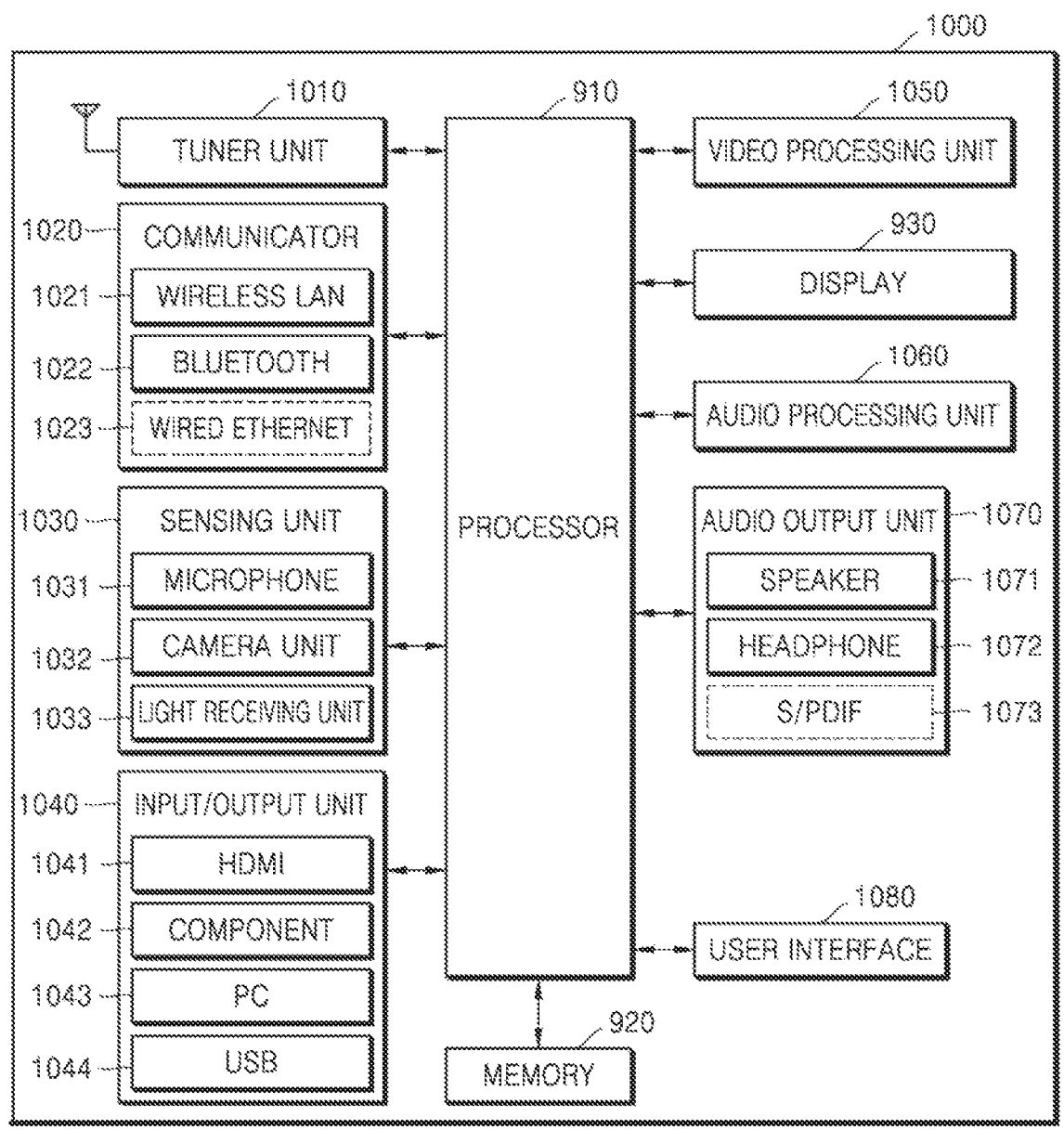
FIG. 10 is a block diagram of a display apparatus, according to an embodiment.

FIG. 10 is a block diagram of a user display apparatus 1000, according to an embodiment of the disclosure. The user display apparatus 1000 of FIG. 10 may include components of the user display apparatus 900 of FIG. 9.

Referring to FIG. 10, the user display apparatus 1000 may include a tuner unit 1010, a communicator 1020, a sensing unit 1030, an input/output unit 1040, a video processing unit 1050, an audio processing unit 1060, an audio output unit 1070, and a user interface 1080, in addition to the processor 910, the memory 920, and the display 930.

The tuner unit 1010 may tune and select only a frequency of a channel which the user display apparatus 1000 wants to receive from among many radio wave components via amplification, mixing, resonance, or the like of broadcast content received in a wired or wireless manner. Content received via the tuner unit 1010 is decoded and separated into audio, video, and/or additional information. The separated audio, video, and/or additional information may be stored in the memory 920 under the control by the processor 910.

The communicator 1020 may connect the user display apparatus 1000 to an external apparatus or a server under the control by the processor 910. The user display apparatus 1000 may download an application or program required by the user display apparatus 1000 from the external apparatus or the server via the communicator 1020, or may perform web browsing. Also, the communicator 1020 may receive content from the external apparatus.

The communicator 1020 may include at least one of the wireless LAN 1021, a Bluetooth 1022, or a wired Ethernet 1023 in response to a performance and a structure of the user display apparatus 1000. The communicator 1020 may receive a control signal via a controller such as a remote control under the control by the processor 910. The control signal may be implemented in a Bluetooth type, an RF signal type, or a Wi-Fi type. The communicator 1020 may further include short-range communication (for example, near field communication (NFC) and Bluetooth low energy (BLE)) in addition to the Bluetooth 1022. According to an embodiment of the disclosure, the communicator 1020 may transmit or receive a connection signal to or from the external apparatus via the short-range communication such as the Bluetooth 1022 or the BLE.

The sensing unit 1030 may sense a user's voice, the user's image, or the user's interaction, and include a microphone 1031, a camera unit 1032, and a light receiving unit 1033.

The microphone 1031 may receive voice uttered by a user, and may convert the received voice to an electrical signal and output the signal to the processor 910. The camera unit 1032 may include a sensor and a lens, and may capture an image formed on a screen. The light receiving unit 1033 may receive an optical signal (including a control signal). The light receiving unit 1033 may receive an optical signal corresponding to a user input (for example, a touch, a press, a touch gesture, voice, or a motion) from the controller such as a remote control or a mobile phone. A control signal may be extracted from the received optical signal under the control by the processor 910.

The input/output unit 1040 may receive additional information such as video (for example, a moving image signal, a still image signal, or the like), audio (for example, a voice signal, a music signal, or the like), and metadata from a device outside the user display apparatus 1000 under the control by the processor 910. The metadata may include HDR information on content, a description or content title on the content, a content storage location, and the like. The input/output unit 1040 may include at least one of a high-definition multimedia interface (HDMI) port 1041, a component jack 1042, a PC port 1043, or a USB port 1044. The input/output unit 1040 may include a combination of the HDMI port 1041, the component jack 1042, the PC port 1043, and the USB port 1044.

The video processing unit 1050 may process image data to be displayed by the display 930, and may perform, on the image data, various image processing operations such as decoding, rendering, scaling, noise filtering, frame rate converting, resolution changing, and the like.

In an embodiment, the video processing unit 1050 may perform the functions of the image quality processing unit 940 of FIG. 9. That is, the video processing unit 1050 may improve quality of a video and/or a frame based on a score for each frame or a final quality score of an entire video obtained by the processor 910.

The video processing unit 1050 may select an image quality processing model according to a score, and accordingly, may improve quality of a frame/video.

Alternatively, the video processing unit 1050 may improve quality of a frame/video by determining the number of times that an image quality processing model is applied according to a score and repeatedly applying the image quality processing model to the frame by the determined number of times.

Alternatively, the video processing unit 1050 may improve quality of a frame/video by designing a filter according to a score and applying the filter to the frame/video.

Alternatively, the video processing unit 1050 may improve quality of a frame by modifying a hyperparameter value according to score and using a neural network having the modified hyperparameter value.

The display 930 may output, on a screen, content received from a broadcasting station or received from an external server, external storage medium, or the like. The content is a media signal, and may include a video signal, an image, a text signal, and the like. Also, the display 930 may display, on a screen, a video signal or image received via the HDMI port 1041.

In an embodiment of the disclosure, when the video processing unit 1050 has improved quality of a video or frame, the display 930 may output the video or frame with improved quality.

When the display 930 is implemented as a touch screen, the display 930 may be used as an input apparatus in addition to an output apparatus. Also, according to an implementation of the user display apparatus 1000, the user display apparatus 1000 may include two or more displays 930.

The audio processing unit 1060 may process on audio data. The audio processing unit 1060 may perform, on the audio data, various processing such as decoding or amplification, noise filtering, and the like.

The audio output unit 1070 may output audio included in content received via the tuner unit 1010, audio input via the communicator 1020 or the input/output unit 1040, or audio stored in the memory 920 under the control by the processor 910. The audio output unit 1070 may include at least one of a speaker 1071, a headphone output terminal 1072, or a Sony/Philips digital interface (S/PDIF) output terminal 1073.

The user interface 1080 may receive a user input for controlling the user display apparatus 1000.

In an embodiment, a user may select a screen setting parameter of the display 930 and change a value of the selected setting parameter, via the user interface 1080.

The user interface 1080 may include various types of user input devices including a touch panel for sensing a user's touch, a button for receiving the user's touch operation, a wheel for receiving the user's rotation operation, a keyboard, a dome switch, a microphone for voice recognition, a motion detection sensor for sensing a motion, and the like, but is not limited thereto. Also, when the user display apparatus 1000 is operated by a remote controller, the user display apparatus 1000 may receive a control signal received from the remote controller.

Figure 11:
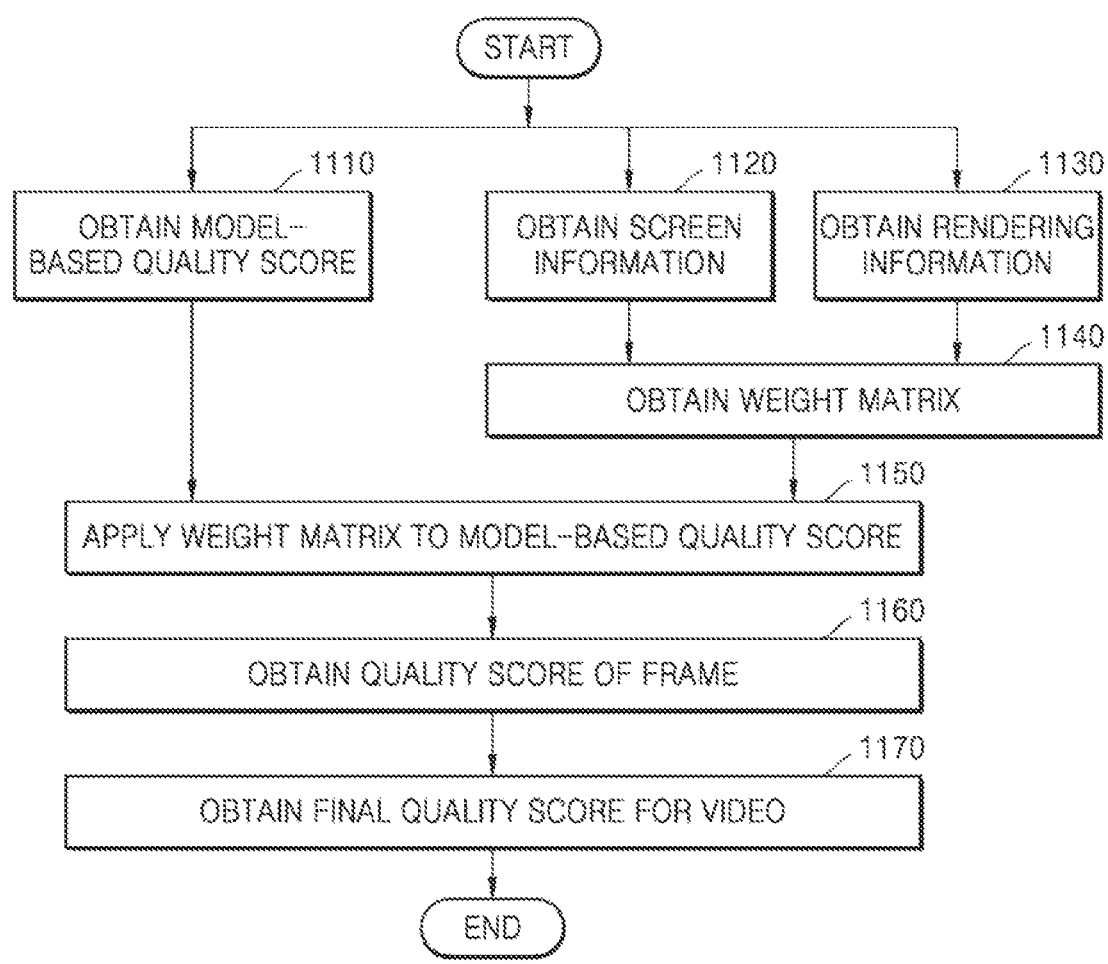
FIG. 11 is a flowchart illustrating a video quality assessing method, according to an embodiment.

FIG. 11 is a flowchart illustrating a video quality assessing method, according to an embodiment.

Referring to FIG. 11, the video quality assessing apparatus 700 may receive an input of a video including a plurality of frames, divide a frame into sub-areas, and obtain a model-based quality score for each sub-area (operation 1110). The video quality assessing apparatus 700 may obtain screen information of a user display apparatus (operation 1120). The screen information may be stored in a memory of the user display apparatus. Alternatively, the video quality assessing apparatus 700 may download and obtain screen information about a screen of a user display apparatus of a certain model from an external server.

The video quality assessing apparatus 700 may obtain rendering information from metadata about content (operation 1130). The video quality assessing apparatus 700 may obtain HDR information from the metadata and obtain a tone mapping graph therefrom. The video quality assessing apparatus 700 may obtain the rendering information by analyzing the tone mapping graph.

The video quality assessing apparatus 700 may obtain a weight matrix by using at least one of the screen information or the rendering information (operation 1140).

The video quality assessing apparatus 700 may obtain a quality score based on a weighted for each sub-area by applying the weight matrix to the model-based quality score for each sub-area (operation 1150).

The video quality assessing apparatus 700 may obtain a quality score of the entire frame based on the score for each sub-area (operation 1160), and may obtain a final quality score for an entire video by accumulating scores of the plurality of frames and obtaining time-series data (operation 1170).

Figure 12:
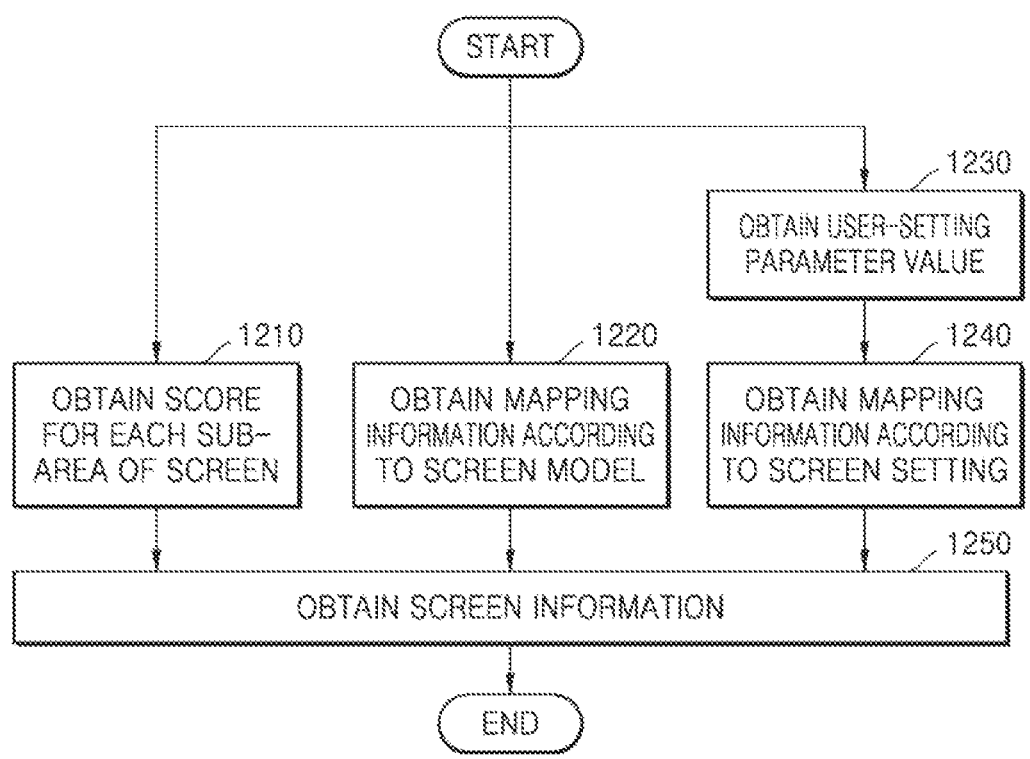
FIG. 12 is a flowchart illustrating a process of obtaining screen information, according to an embodiment.

FIG. 12 is a flowchart illustrating a process of obtaining screen information, according to an embodiment.

Referring to FIG. 12, the video quality assessing apparatus 700 may obtain a score for each sub-area of a screen when a user display apparatus is greater than or equal to a certain size (operation 1210). When a user looks at a screen, the user usually look at the central portion, the score for each sub-area of a screen is a score of a degree to which distortion included in the central portion and other portions affects a quality score when a screen size is greater than or equal to a certain size.

The video quality assessing apparatus 700 may obtain mapping information according to a screen model from a memory of the user display apparatus (operation 1220). The mapping information according to a screen model may indicate a relationship of a quality score according to a difference in a screen size or resolution between an assessor display apparatus and a user display apparatus.

In an embodiment, a user may change a setting parameter for the screen of the user display apparatus to a desired value.

The video quality assessing apparatus 700 may obtain a parameter value selected by a user (operation 1230), and may obtain mapping information according to a screen setting therefrom (operation 1240). The mapping information according to a screen setting may be pre-stored in the memory of the user display apparatus. The video quality assessing apparatus 700 may search for a quality score difference according to a type of a parameter set by a user and a difference between a setting value of the parameter of the type and a default setting value from the mapping information according to a screen setting.

The video quality assessing apparatus 700 may obtain screen information including at least one of the score for each sub-area of a screen, the mapping information according to a screen model, or the mapping information according to a screen setting (operation 1250).

Figure 13:
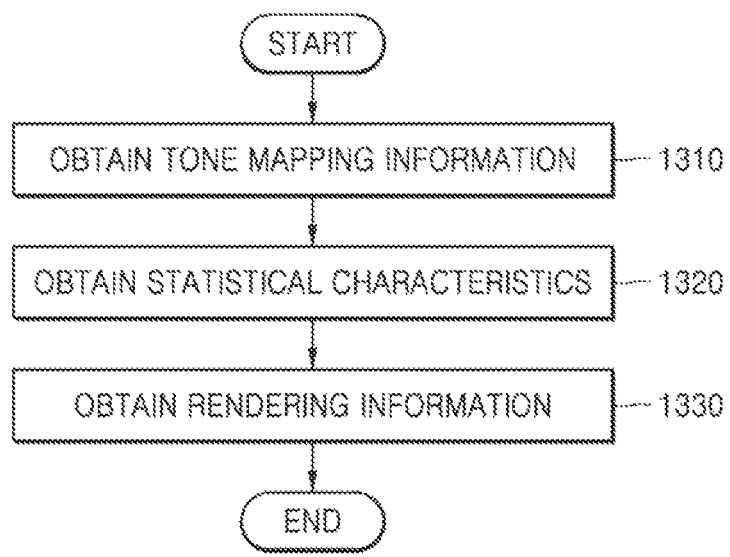
FIG. 13 is a flowchart illustrating a process of obtaining rendering information, according to an embodiment.

FIG. 13 is a flowchart illustrating a process of obtaining rendering information, according to an embodiment.

The video quality assessing apparatus 700 may adjust a quality assessment score by using an HDR used when rendering content.

The video quality assessing apparatus 700 may obtain HDR information from metadata received along with a video. The video quality assessing apparatus 700 may obtain tone mapping information from the HDR information (operation 1310). The tone mapping information may include a tone mapping graph. The video quality assessing apparatus 700 may obtain a tone mapping graph for each frame. Alternatively, the video quality assessing apparatus 700 may obtain the same tone mapping graph for all frames.

The video quality assessing apparatus 700 may obtain statistical characteristics by analyzing the tone mapping graph (operation 1320).

The video quality assessing apparatus 700 may obtain rendering information from the statistical characteristics of the tone mapping graph (operation 1330).

The video quality assessing apparatus 700 may use rendering information when generating a weight matrix so that rendering characteristics of content is reflected in an assessment score.

A video quality assessing method and apparatus according to some embodiments of the disclosure may be also implemented in the form of a recording medium including instructions executable by a computer such as a program module executed by the computer. Computer-readable media may be any available media that may be accessed by the computer, and includes both volatile and non-volatile media, and removable and non-removable media. Also, the computer-readable media may include both computer storage media and communication media. The computer storage media include both volatile and non-volatile, removable and non-removable media implemented in any method or technology for storage of information such as computer readable instructions, data structures, program modules, or other data. The communication media typically includes computer readable instructions, data structures, program modules, other data in a modulated data signal such as a carrier wave, or other transmission mechanism, and includes any information transmission media.

In addition, the term "unit" as used herein may be a hardware component such as a processor or a circuit, and/or a software component executed by hardware such as a processor.

The video quality assessment method and apparatus according to an embodiment may be implemented as a computer program product including a computer-readable recording medium having recorded thereon a program for implementing a video quality assessing method, the method including obtaining a model-based quality score for each of a plurality of sub-areas included in a frame by using a neural network trained based on a mean opinion score (MOS) obtained by using an assessor display apparatus, obtaining a weight matrix from at least one of rendering information or screen information about a screen included in a user display apparatus, applying the obtained weight matrix to the model-based quality score for each sub-area, and based on the model-based quality score for each sub-area to which the weight matrix is applied, obtaining a quality score of the frame.

A video quality assessing method and apparatus according to an embodiment of the disclosure may accurately assess quality of a frame by applying a weight matrix to a model-based quality score.

A video quality assessing method and apparatus according to an embodiment of the disclosure may assess quality of a frame by considering screen characteristics of a display apparatus.

A video quality assessing method and apparatus according to an embodiment of the disclosure may assess quality of a frame by considering rendering characteristics of content.

The above description is for illustrative purposes only, and those of ordinary skill in the art to which the disclosure pertains will be able to understand that modifications, substitutions, improvements and equivalents thereof may be made without departing from the scope of the disclosure. Accordingly, it should be understood that the embodiments of the disclosure described above are illustrative and non-limiting in all respects. For example, each component described as a single form may be implemented in a distributed manner, and similarly, components described as being distributed may also be implemented in a combined form.

What is claimed is:

1. A video quality assessing method by using only a distorted image rather than a reference image, the video quality assessing method comprising:
    obtaining a model-based quality score for each of a plurality of sub-areas included in a frame by using a neural network, the neural network being trained based on a mean opinion score (MOS) obtained by using an assessor display apparatus;
    obtaining a screen information from a mapping table pre-stored in a user display apparatus;
    obtaining a weight matrix from at least one of rendering information or the screen information about a screen included in the user display apparatus;
    applying the weight matrix to the model-based quality score for each sub-area of the plurality of sub-areas; and
    obtaining a quality score of the frame, based on the model-based quality score for each sub-area to which the weight matrix is applied.

2. The video quality assessing method of claim 1, wherein the screen information comprises at least one of screen model mapping information or screen setting mapping information.

3. The video quality assessing method of claim 2, wherein the screen information further comprises a score for each sub-area included in the screen of the user display apparatus.

4. The video quality assessing method of claim 2, wherein the screen model mapping information comprises a score relationship according to a difference between a screen model of the assessor display apparatus and a screen model of the user display apparatus, and
    wherein the difference between the screen model of the assessor display apparatus and the screen model of the user display apparatus is a difference of at least one of a screen size or a resolution.

5. The video quality assessing method of claim 2, wherein the screen setting mapping information indicates a score relationship according to a difference between a default setting value for the screen of the user display apparatus and a setting value selected by a user.

6. The video quality assessing method of claim 5, wherein the setting value comprises a value for at least one of backlight brightness, contrast, gamma, sharpness, color, brightness, or tint for the screen of the user display apparatus.

7. The video quality assessing method of claim 1, wherein the rendering information is obtained from statistical characteristics of a tone mapping graph obtained from high dynamic range (HDR) information extracted from metadata of a video.

8. The video quality assessing method of claim 7, wherein the tone mapping graph is obtained for each frame among a plurality of frames in the video.

9. The video quality assessing method of claim 1, further comprising:
    obtaining a final quality score for a video by accumulating the quality score of the frame for a certain period of time, obtaining time-series data, and smoothing the time-series data; and
    processing image quality of the video by using the quality score of the frame.

10. A video quality assessing apparatus for performing a video quality assessing method by using only a distorted image rather than a reference image, the video quality assessing apparatus comprising:
    a memory storing one or more instructions; and
    a processor configured to execute the one or more instructions stored in the memory to:
        obtain a model-based quality score for each of a plurality of sub-areas included in a frame by using a neural network, the neural network being trained based on a mean opinion score (MOS) obtained by using an assessor display apparatus,
        obtain a screen information from a mapping table pre-stored in a user display apparatus, obtain a weight matrix from at least one of rendering information or the screen information about a screen included in the user display apparatus, apply the weight matrix to the model-based quality score obtained for each sub-area, and obtain a quality score of the frame, based on the model-based quality score obtained for each sub-area to which the weight matrix is applied.

11. The video quality assessing apparatus of claim 10, wherein the screen information comprises at least one of screen model mapping information or screen setting mapping information.

12. The video quality assessing apparatus of claim 11, wherein the screen information further comprises a score for each sub-area included in the screen of the user display apparatus.

13. The video quality assessing apparatus of claim 11, wherein the screen model mapping information comprises a score relationship according to a difference between a screen model of the assessor display apparatus and a screen model of the user display apparatus, and wherein the difference between the screen model of the assessor display apparatus and the screen model of the user display apparatus is a difference of at least one of a screen size or a resolution.

14. The video quality assessing apparatus of claim 11, wherein the screen setting mapping information indicates a score relationship according to a difference between a default setting value for the screen of the user display apparatus and a setting value selected by a user.

15. The video quality assessing apparatus of claim 14, wherein the setting value comprises a value for at least one of brightness, contrast, gamma, backlight brightness, sharpness, color, or tint for the screen of the user display apparatus.

16. The video quality assessing apparatus of claim 10, wherein the processor is further configured to obtain a tone mapping graph from high dynamic range (HDR) information extracted from metadata of a video and obtain the rendering information from statistical characteristics of the tone mapping graph.

17. The video quality assessing apparatus of claim 16, wherein the tone mapping graph is obtained for each frame among a plurality of frames of the video.

18. A non-transitory computer-readable recording medium having recorded thereon a program that is executed by a computer to perform a video quality assessing method by using only a distorted image rather than a reference image, the video quality assessing method comprising:

obtaining a model-based quality score for each of a plurality of sub-areas included in a frame by using a neural network, the neural network being trained based on a mean opinion score (MOS) obtained by using an assessor display apparatus;

obtaining a screen information from a mapping table pre-stored in a user display apparatus;

obtaining a weight matrix from at least one of rendering information or the screen information about a screen included in the user display apparatus;

applying the weight matrix to the model-based quality score for each sub-area of the plurality of sub-areas; and obtaining a quality score of the frame, based on the model-based quality score for each sub-area to which the weight matrix is applied.

\* \* \* \* \*